US010082402B2

(12) United States Patent
Jung et al.

(10) Patent No.: US 10,082,402 B2
(45) Date of Patent: Sep. 25, 2018

(54) PARKING PATH GENERATION DEVICE, SYSTEM INCLUDING THE SAME, AND METHOD THEREOF

(71) Applicant: HYUNDAI MOTOR COMPANY, Seoul (KR)

(72) Inventors: Chan Hee Jung, Anyang-si (KR); Kyung Soo Ha, Pohang-si (KR); Wan Seok Yang, Seoul (KR); Gil Won Seo, Hwaseong-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 15/433,380

(22) Filed: Feb. 15, 2017

(65) Prior Publication Data
US 2018/0156632 A1 Jun. 7, 2018

(30) Foreign Application Priority Data

Dec. 2, 2016 (KR) .................. 10-2016-0163461

(51) Int. Cl.
*G01C 21/36* (2006.01)
*G05D 1/00* (2006.01)
*G05D 1/02* (2006.01)

(52) U.S. Cl.
CPC ....... *G01C 21/3685* (2013.01); *G05D 1/0011* (2013.01); *G05D 1/0088* (2013.01); *G05D 1/0231* (2013.01); *G05D 1/0246* (2013.01); *G05D 1/0255* (2013.01)

(58) Field of Classification Search
CPC ............ G01C 21/3685; G05D 1/0011; G05D 1/0088; G05D 1/0255; G05D 1/0246; G05D 1/0231
See application file for complete search history.

(56) References Cited

U.S. PATENT DOCUMENTS

| 7,482,949 | B2 * | 1/2009 | Kubota | B62D 15/0275 340/903 |
| 2007/0063874 | A1 * | 3/2007 | Danz | B60Q 9/006 340/932.2 |
| 2007/0097209 | A1 * | 5/2007 | Kubota | B62D 15/0275 348/118 |
| 2010/0286875 | A1 * | 11/2010 | Inoue | B62D 15/027 701/49 |

(Continued)

FOREIGN PATENT DOCUMENTS

| JP | 2016-053905 A | 4/2016 |
| KR | 10-1575485 B1 | 12/2015 |
| KR | 10-2016-0123129 A | 10/2016 |

*Primary Examiner* — Russell Frejd
(74) *Attorney, Agent, or Firm* — Brinks Gilson & Lione

(57) ABSTRACT

The present disclosure provides a parking path generation device, a system including the same, and a method of automatically parking a vehicle. The parking path generation device includes: a parking space search unit to search for a parking space in a forward direction or in a reverse direction, a control unit to control a search direction of the parking space search unit, and to determine whether the parking space search unit fails to find the parking space in the search direction, and a path generation unit to generate a parking path in the search direction when the parking space search unit successfully finds the parking space.

20 Claims, 11 Drawing Sheets

(56) References Cited

U.S. PATENT DOCUMENTS

| | | | |
|---|---|---|---|
| 2013/0060421 A1* | 3/2013 | Kadowaki | B62D 15/027 |
| | | | 701/36 |
| 2015/0054661 A1* | 2/2015 | Noh | G08G 1/141 |
| | | | 340/932.2 |
| 2015/0213715 A1 | 7/2015 | Schulz | |
| 2016/0110619 A1* | 4/2016 | Kim | G06K 9/00812 |
| | | | 382/104 |
| 2016/0288833 A1* | 10/2016 | Heimberger | B62D 15/027 |
| 2016/0304088 A1* | 10/2016 | Barth | B60T 7/22 |

* cited by examiner

PARKING PATH GENERATION DEVICE, SYSTEM INCLUDING THE SAME, AND METHOD THEREOF

CROSS-REFERENCE TO RELATED APPLICATION

This application claims priority to and the benefit of Korean Patent Application No. 10-2016-0163461, filed on Dec. 2, 2016, which is incorporated herein by reference in its entirety.

FIELD

The present disclosure relates to a parking path generation device, a system including the same, and a method thereof.

BACKGROUND

The statements in this section merely provide background information related to the present disclosure and may not constitute prior art.

In general, there are parking systems for the convenience of a driver. The parking systems, such as auto-parking systems and parking assist systems, assist the driver in parking a vehicle by searching for parking spaces. The automatic parking system is a system to automatically control steering, gear shifting, braking, and driving while the vehicle follows a parking trajectory. The automatic parking system first searches for the parking spaces, and carries out the parking upon an input from an operation button manipulated by the driver after the searching for the parking space is finished. The automatic parking system performs a remote function by a remote controller such that a vehicle is put or withdrawn into or from the parking space in an environment, such as a narrow parking space, in which the driver is difficult to get on and off.

Regarding such an automatic parking system, a vehicle searches for parking spaces information. In some cases, the vehicle may not find the parking spaces by one time search. In this case, the vehicle must unnecessarily travel to search for the parking spaces due to the characteristic of the auto parking system.

SUMMARY

The present disclosure addresses to the above-mentioned problems occurring in the prior art while advantages achieved by the prior art are maintained intact.

In one form, the present disclosure provides a parking path generation device capable of searching for parking spaces by allowing a vehicle to reverse a searching direction, avoiding unnecessary traveling when the vehicle fails to find the parking spaces at one time or when the vehicles misses the parking spaces. The parking path generation device generates a parking path, thereby reducing parking time and increasing the convenience of a driver. The present disclosure also provides a system including the parking path generation device, and a method thereof.

The technical problems addressed by the present disclosure are not limited to the aforementioned problems, and any other technical problems not mentioned herein will be clearly understood from the following description by those skilled in the art to which the present disclosure pertains.

According to an aspect of the present disclosure, a parking path generation device may include: a parking space search unit that searches for a parking space in a forward direction or in a reverse direction; a control unit that controls a search direction of the parking space search unit based on parking intention of a driver and a travelling direction of a vehicle, and that determines whether the parking space search unit fails to find the parking space in the search direction; and a path generation unit which generates a parking path in the search direction when the parking space search unit successfully finds the parking space.

In one form, the control unit may control the parking space search unit to search for the parking space in the forward direction, when the travelling direction of the vehicle is the forward direction, and may control the parking space search unit to search for the parking space in the reverse direction, when the travelling direction of the vehicle is the reverse direction.

In another form, the control unit may determine whether the driver continuously has the parking intention, when the parking space search unit fails to find the parking space.

The control unit may control the parking space search unit to search for the parking space in an opposite direction to a direction that the parking space search unit fails to find the parking space, when the driver continuously has the parking intention.

The control unit may control the parking space search unit to search for the parking space in the reverse direction, when the driver continuously has the parking intention and when the parking space search unit fails to find the parking space in the forward direction.

In another form, the control unit may determine whether the parking space search unit fails to search for the parking space in the reverse direction, determine whether the driver continuously has the parking intention, when the parking space search unit fails to find the parking space in the reverse direction, and control the parking space search unit to search for the parking space in the forward direction, when the driver continuously has the parking intention.

The control unit may control the parking space search unit to terminate the searching for the parking space, when the driver has no continuous parking intention.

In one form, the path generation unit may generate the parking path in the reverse direction, when the parking space is successfully found in the reverse direction.

In another form, the parking path generation device may further include an automatic parking assist unit that assists in automatic parking along the parking path.

According to one form, the parking path generation device may further include a display unit that displays the parking path on a screen.

According to an aspect of the present disclosure, a system for generating a parking path, may include a vehicle surrounding sense device that senses a parking space surrounding a vehicle, and a parking path generation device that searches for the parking space by using a sensing result of the vehicle surrounding sense device and by automatically switching a direction of searching for the parking space based on parking intention of a driver and a travelling direction of the vehicle.

According to one form, the vehicle surrounding sense device may include at least one of an ultrasonic sensor, a lidar sensor, and a camera.

According to another form, the parking path generation device may include: a parking space search unit that searches for the parking space in an forward direction or in a reverse direction; a control unit that controls a search direction of the parking space search unit based on the parking intention of the driver and the travelling direction of the vehicle, and determines whether the parking space search unit fails to find the parking space in the search direction; and a path generation unit that generates a parking path in the search direction when the parking space search unit successfully finds the parking space.

According to another form, the control unit may control the parking space search unit to search for the parking space in the forward direction, when the travelling direction of the vehicle is the forward direction, and may control the parking space search unit to search for the parking space in the reverse direction, when the travelling direction of the vehicle is the reverse direction.

In still another form, the control unit may determine whether the driver continuously has the parking intention, when the parking space search unit fails to find the parking space, may control the parking space search unit to search for the parking space in an opposite direction to a direction that the parking space search unit fails to find the parking space, when the driver continuously has the parking intention, and may control the parking space search unit to terminate the searching for the parking space, when the driver has no continuous parking intention.

According to one form, the system may further include a remote control device that remotely requests for the searching for the parking space.

According to another aspect of the present disclosure, a method of generating a parking path, may include: entering a parking assist mode; searching, by a parking space search unit, for a parking space in a forward direction when a present direction of searching for the parking space is the forward direction; determining, by a control unit, whether the parking space is successfully found in the forward direction; determining, by the control unit, whether a driver continuously has parking intention, when the parking space is not found in the forward direction; searching, by the parking space search unit, for the parking space in a reverse direction when the driver continuously has the parking intention; and generating, by a path generation unit, the parking path in the reverse direction when the parking space is successfully found in the reverse direction.

According to one form, the method may further include: determining, by the control unit, whether the driver continuously has the parking intention, when the parking space is not found in the reverse direction; and searching, by the parking space search unit, for the parking space in the forward direction when the driver continuously has the parking intention.

In another form, the method may further include automatically assisting, by an automatic parking assist unit, in parking along the parking path in the forward direction, when the parking space is successfully found in the forward direction.

According to one form, the method may further include exiting from the parking assist mode when the driver has no the continuous parking intention.

According to another form, the searching for the parking space in the forward direction or the reverse direction may be performed using at least one of an ultrasonic sensor, a lidar sensor, and a camera.

According to still another form, the entering of the parking assist mode may be performed through a remotely-controlling operation by a remote control device.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
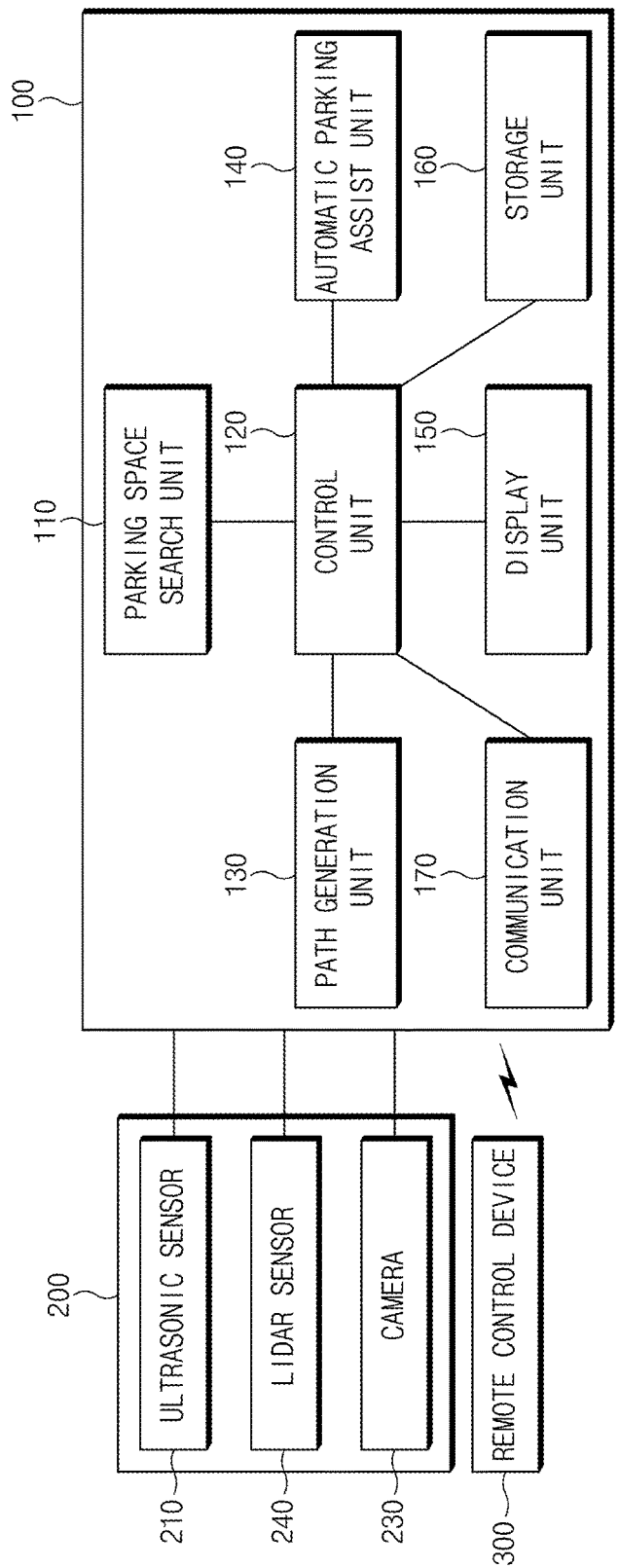
FIG. 1 is a block diagram illustrating the configuration of a system for generating a parking path.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In addition, in the following description, a detailed description of well-known features or functions will be ruled out in order not to unnecessarily obscure the gist of the present disclosure.

In the following description of elements according to one form of the present disclosure, the terms 'first', 'second', 'A', B', '(a)', and '(b)' may be used. The terms are used only to distinguish relevant elements from other elements, and the nature, the order, or the sequence of the relevant elements is not limited to the terms. In addition, unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, forms of the present disclosure will be described with reference to FIGS. 1 to 8.

Figure 2:
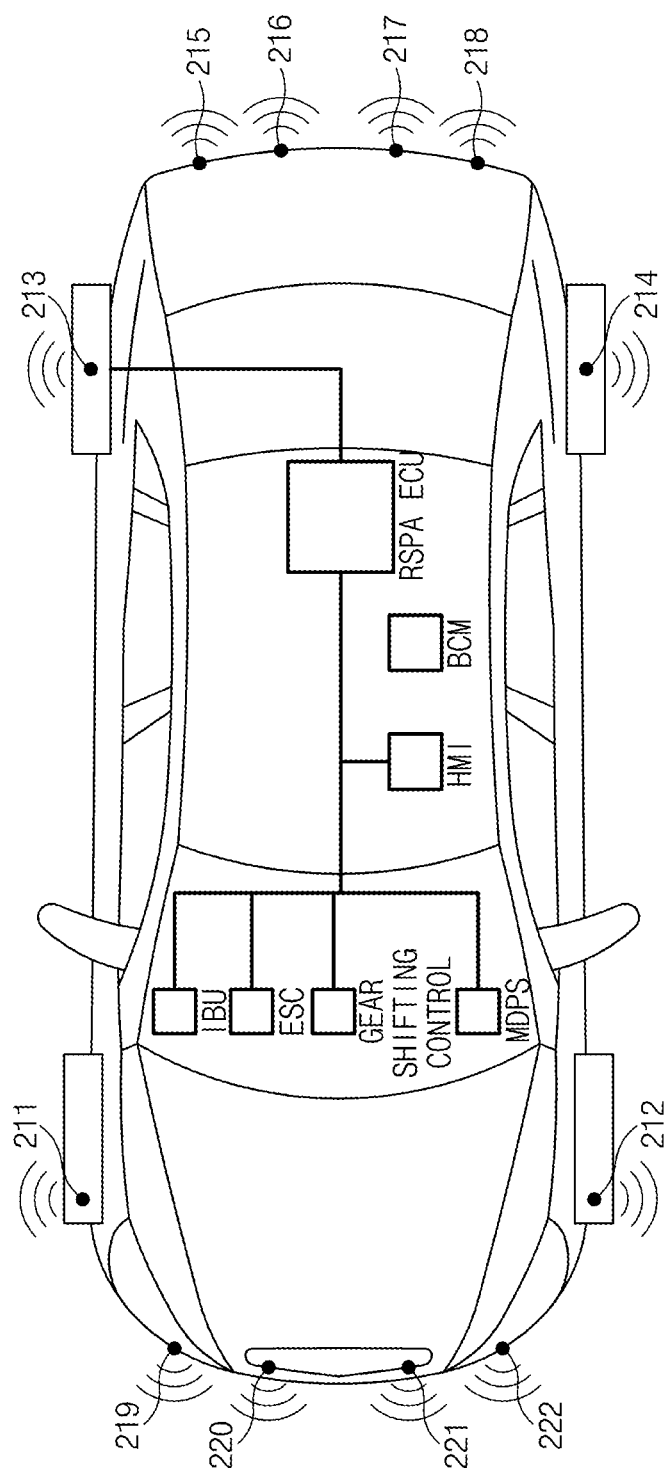
FIG. 2 is a drawing illustrating a parking path generation device mounted in a vehicle.

FIG. 1 is a block diagram illustrating the configuration of a system for generating a parking path, in one form of the present disclosure, and FIG. 2 is a drawing illustrating a parking path generation device mounted in a vehicle, according to one form of the present.

Referring to FIG. 1, the system for generating a parking path includes a parking path generation device 100 and a vehicle surrounding sense device 200.

The vehicle surrounding sense device 200 may include an ultrasonic sensor 210, a lidar sensor 240, and a camera 230.

The ultrasonic sensor 210 senses a parking space through an ultrasonic wave, and provides the sense result to the parking path generation device 100. In this case, as shown in FIG. 2, the ultrasonic sensor 210 includes front-side portion ultrasonic sensors 211 and 212, which are mounted on front left and right portions of a vehicle and senses left and right parking spaces positioned at front-side portions of the vehicle. The ultrasonic sensor 210 includes rear-side ultrasonic sensors 213 and 214 which are mounted on rear left and right portions of the vehicle and senses left and right parking spaces positioned at rear-side portions of the vehicle. The ultrasonic sensor 210 includes rear portion ultrasonic sensors 215, 216, 217, and 218, which senses a space located in a rear side of the vehicle, and front portion ultrasonic sensors 219, 220, 221, and 222 which senses a space located in a front side of the vehicle.

The lidar sensor 240 senses a parking space through lidar and provides the sense result to the parking path generation device 100.

The camera 230 photographs surroundings of the vehicle and provides an image of the surroundings to the parking path generation device 100.

The parking path generation device 100 searches for the parking space by automatically switching a direction of searching for the parking space between forward and reverse directions, and generates a parking path to assist in parking.

To this end, the parking path generation device 100 includes a parking space search unit 110, a control unit 120, a path generation unit 130, an automatic parking assist unit 140, a display unit 150, a storage unit 160, and a communication unit 170.

Figure 3A:
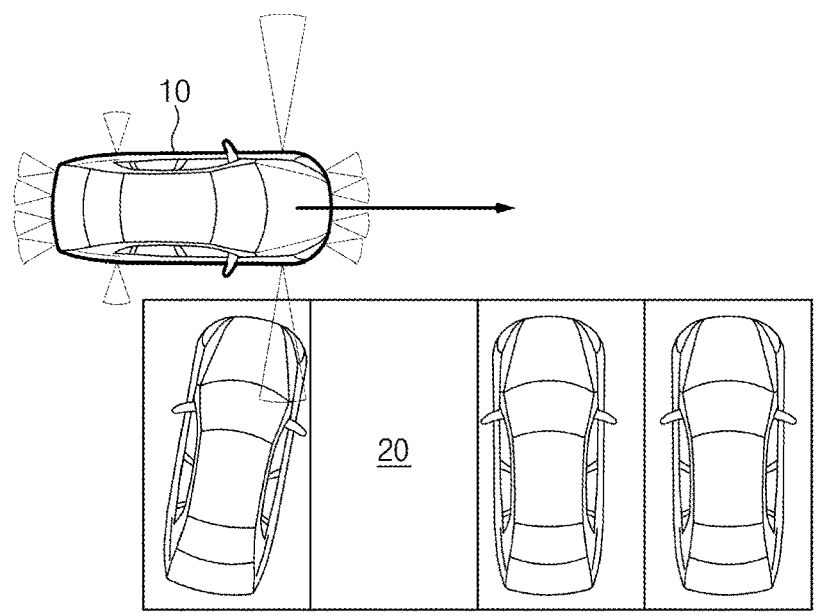
FIG. 3A is a drawing illustrating searching for the parking space in a forward direction.
Figure 3B:
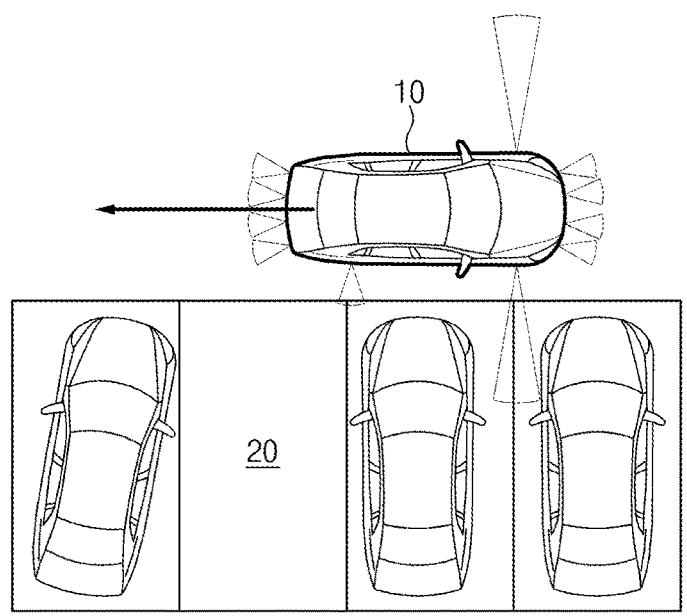
FIG. 3B is a drawing illustrating searching for the parking space in the reverse direction after the parking space is not found.

The parking space search unit 110 searches for a parking space in the forward direction or in the reverse direction of the vehicle. FIG. 3A is a drawing illustrating that a vehicle 10 searches for the parking space in the forward direction and FIG. 3B is a drawing illustrating that the vehicle 10 searches for the parking space in the reverse direction. In this case, the parking space search unit 110 operates together with the ultrasonic sensor 210, the lidar sensor 240, and the camera 230, which are mounted on the front portion of the vehicle 10, when parking space search unit 110 searches for the parking space in the forward direction. In addition, the parking space search unit 110 operates together with the ultrasonic sensor 210, the lidar sensor 240, and the camera 230, which are mounted on the rear portion of the vehicle 10, when the parking space search unit 110 searches for the parking space in the reverse direction.

Figure 4A:
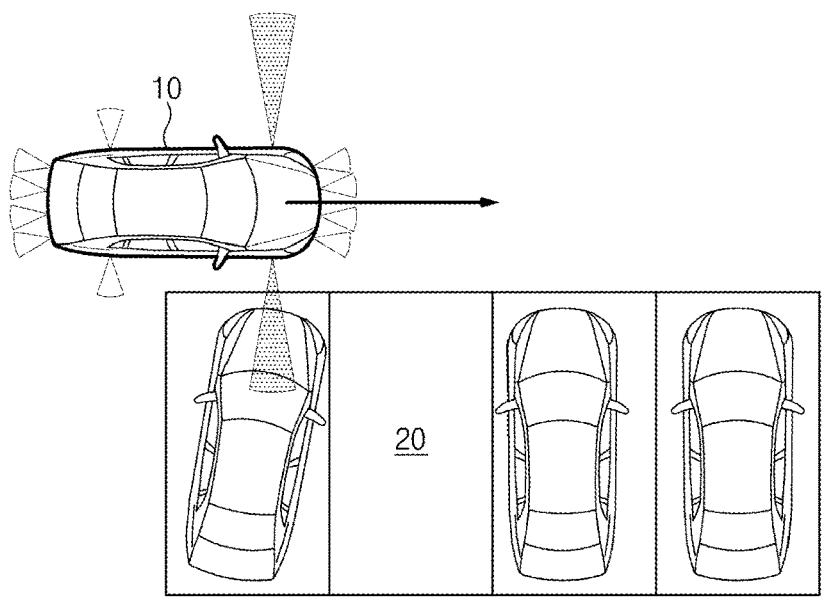
FIG. 4A is a drawing illustrating the searching for the parking space in the forward direction using an ultrasonic sensor.
Figure 4B:
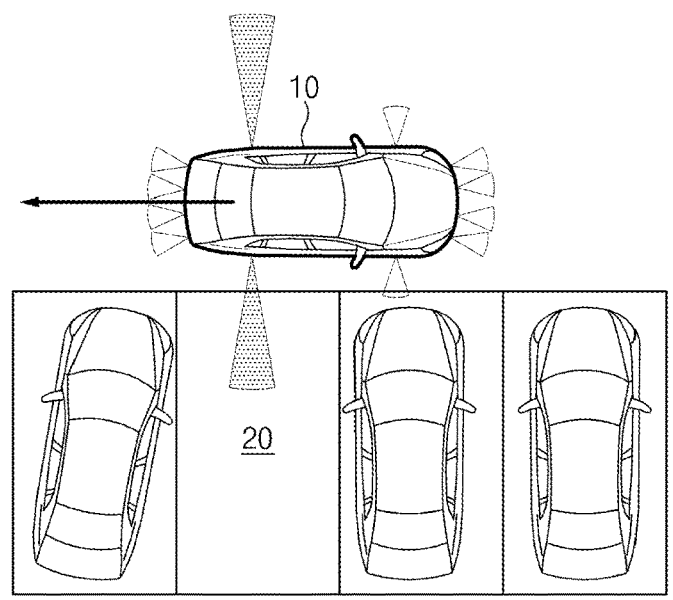
FIG. 4B is a drawing illustrating the searching for the parking space in the reverse direction using the ultrasonic sensor.
Figure 4C:
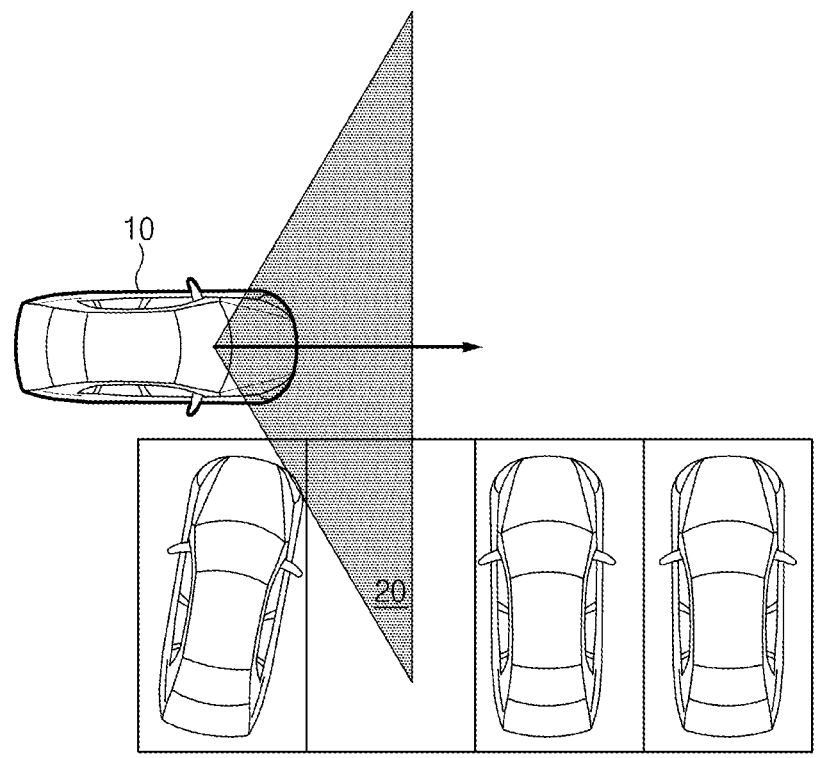
FIG. 4C is a drawing illustrating the searching for the parking space in the forward direction using a camera or a lidar.
Figure 4D:
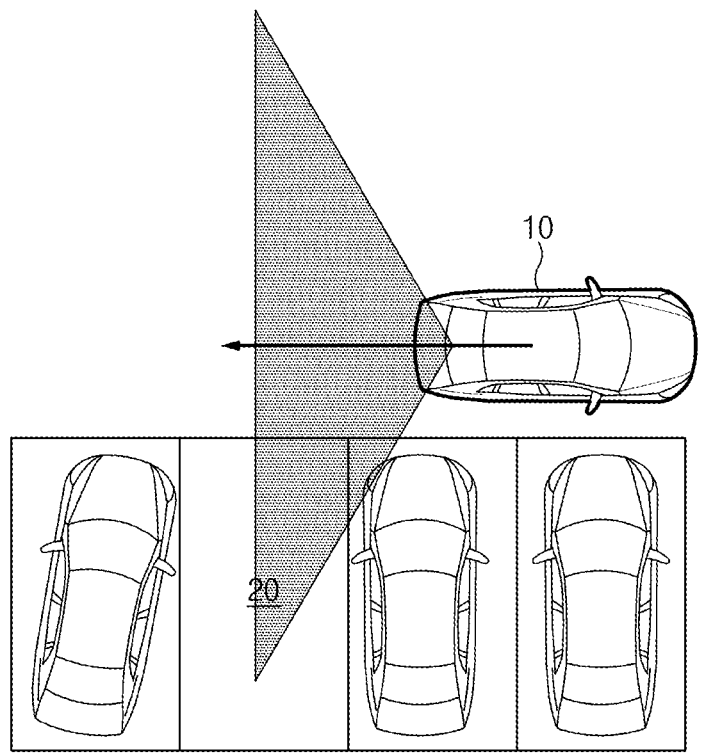
FIG. 4D is a drawing illustrating the searching for the parking space in the reverse direction using the camera or the lidar sensor.

FIG. 4A is a drawing illustrating the searching for the parking space in the forward direction using the ultrasonic sensor, in one form of the present disclosure, and FIG. 4B is a drawing illustrating the searching for the parking space in the reverse direction using the ultrasonic sensor, in one form of the present disclosure. FIG. 4C is a drawing illustrating the searching for the parking space using the camera or the lidar in the forward direction, in one form of the present disclosure, and FIG. 4D is a drawing illustrating the searching for the parking space in the reverse direction using the camera or the lidar sensor, in one form of the present disclosure.

The control unit 120 controls a search direction of the parking space search unit 110 based on parking intention of a driver and the travelling direction of the vehicle. The parking intention of the driver may be determined depending on whether a parking button is pressed or released by the driver, or whether a parking button signal is received from a remote control device 300 such as a remote key. The travelling direction of the vehicle may be determined depending on a gear state of the vehicle (e.g., a shift stage of a transmission). In other words, the travelling direction of the vehicle may be determined as the reverse direction when a gear shifter is positioned in the reverse position (R), and the travelling direction of the vehicle may be determined as the forward direction when the gear shifter is positioned in the drive position (D).

In other words, the control unit 120 controls the parking space search unit 110 to search for the parking space in the forward direction when the travelling direction of the vehicle is the forward direction, and controls the parking space search unit 110 to search for the parking space in the reverse direction when the travelling direction of the vehicle is the reverse direction.

Figure 3C:
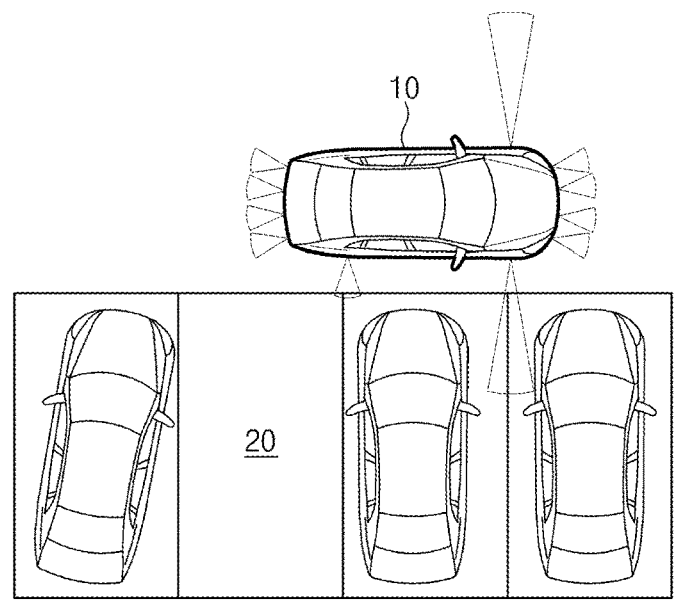
FIG. 3C is a drawing illustrating failing to find the parking space.

The control unit 120 determines whether the parking space search unit 110 fails to search for the parking space, and determines whether the driver continues to seek for the parking space after the parking space search unit 110 does not find the parking space. As shown in FIG. 3C, the vehicle 10 may pass a parking space 20 and may fail to search for the parking space 20. Situations where the vehicle 10 fails to search for the parking space may include various cases: for example, a case that a first parking space search operation is insufficiently performed and thus the correction is desired, a case that a search condition is not satisfied during the first parking space search operation, a case that a parking command is continuously issued by the driver, and a case that a parking space search operation is canceled due to the interference with another system.

The case that the first parking space search operation is insufficiently performed and the correction thereof is desired may occur when data of obstacles in the parking space is less than a predetermined number or size, when data errors occur in the vehicle surrounding sense device 200, or when the failure of recognizing the parking space undermines the recognition of the precise position of the parking space.

The situations where the search condition is not satisfied during the first parking space search operation may include: for example, a case that a search direction angle of the vehicle is out of a direction angle range when the searching for the parking space is performed, a case that the variation in the direction angle of the vehicle is out of a range for the variation in the direction angle, a case that a rate of searching for the parking space is out of a range to support the rate of searching for the parking space, and a case that the first parking trajectory is not created although the parking space is recognized.

The case that the parking command is continuously issued by the driver may include a case that the parking command by the driver is carried out according to the procedure of a parking system or a case that the driver repeatedly passes the same parking space satisfying the search condition.

The case that the parking space search operation is canceled due to the interference with another system may include cases that the parking space search operation is canceled due to the activation of a traction control system (TCS) and tire slip.

The control unit 120 controls the parking space search unit 110 to search for the parking space in a direction opposite to the direction that the parking space search unit 110 fails to search for the parking space in order to continuously search for the parking space, when the parking space search unit 110 fails to search for the parking space and then the driver continuously has the parking intention. In this case, the control unit 120 controls the parking space search unit 110 to search for the parking space in the reverse direction, when the driver continuously has the parking intention, and when the parking space search unit 110 fails to search for the parking space in the forward direction.

The control unit 120 determines whether the driver continuously has the parking intention when the parking space search unit fails to search for the parking space in the reverse direction, and controls the parking space search unit 110 to search for the parking space in the forward direction when the driver continuously has the parking intention. Meanwhile, the control unit 120 controls the parking space search unit 110 to terminate the searching for the parking space, when the driver has no continuous parking intention.

The path generation unit 130 generates the parking path in a relevant direction, when the parking space search unit 110 successfully finds the parking space. In other words, when the parking space search unit 110 successfully finds the parking space in the forward direction, the path generation unit 130 generates the parking path in the forward direction. When the parking space search unit 110 successfully finds the parking space in the reverse direction, the path generation unit 130 generates the parking path in the reverse direction.

Figure 3D:
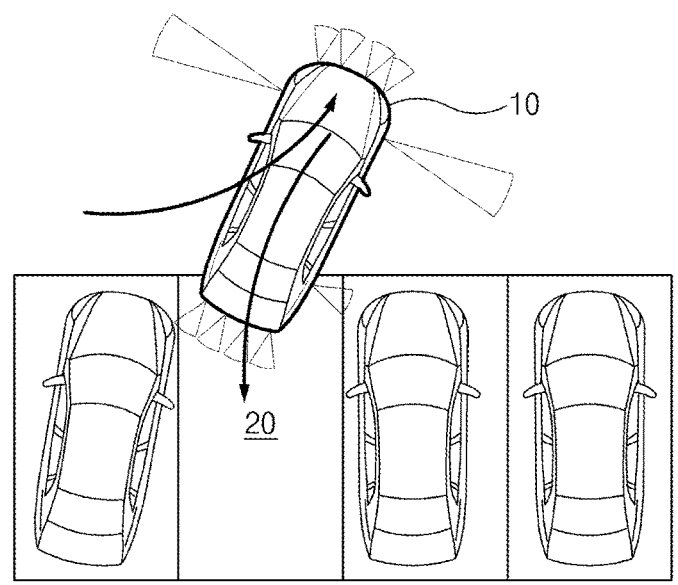
FIG. 3D is a drawing illustrating assistance in parking through generation of a parking path in the reverse direction.
Figure 5A:
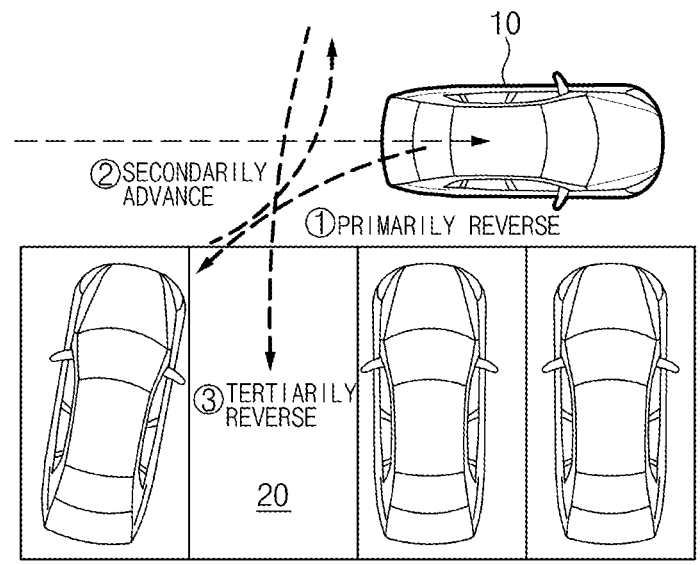
FIG. 5A is a drawing illustrating assistance in parking through generation of a parking path in the forward direction.
Figure 5B:
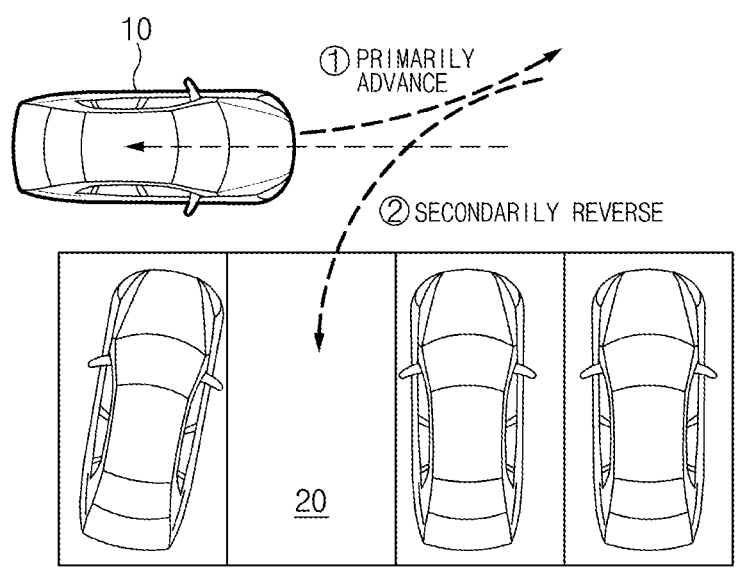
FIG. 5B is a drawing illustrating assistance in parking through generation of a parking path in the reverse direction.

The automatic parking assist unit 140 assists the automatic parking along the parking path generated by the path generation unit 130. As shown in FIG. 3D, the automatic parking assist unit 140 may assist the parking along the parking path to the parking space found in the reverse direction. FIG. 5A is a drawing illustrating assisting in the parking by generating the parking path in the forward direction. FIG. 5B is a drawing illustrating the assisting in the parking by generating the parking path in the reverse direction. Referring to FIG. 5A, the automatic parking assist unit 140 assists in the parking and thus completes the parking by primarily reversing the vehicle, secondarily advancing the vehicle, and then tertiarily reversing the vehicle after the parking space is found in the forward direction. Referring to FIG. 5B, the automatic parking assist unit 140 assists in the parking and thus completes the parking by primarily advancing the vehicle, and secondarily reversing the vehicle after the parking space is found in the reverse direction.

The display unit 150 displays a parking assist screen, an entry direction of the vehicle, and the parking path of the vehicle when the automatic assisting in the parking is performed. In this case, the parking assist screen is shown in FIGS. 5A and 5B.

The storage unit 160 stores information in the parking assist screen, the entry direction of the vehicle, and the parking path of the vehicle.

The communication unit 170 wirelessly communicates with the remote control device 300 such as the remote key.

The remote control device 300 remotely transmits a command signal to the parking path generation device 100 as the driver presses a parking space search button or a parking assist button at a remote position from the vehicle. When the driver continuously presses a parking button, the remote control device 300 may determine that the parking space is not found, may automatically search for a parking space in an opposite direction, and may perform parking.

Figure 6A:
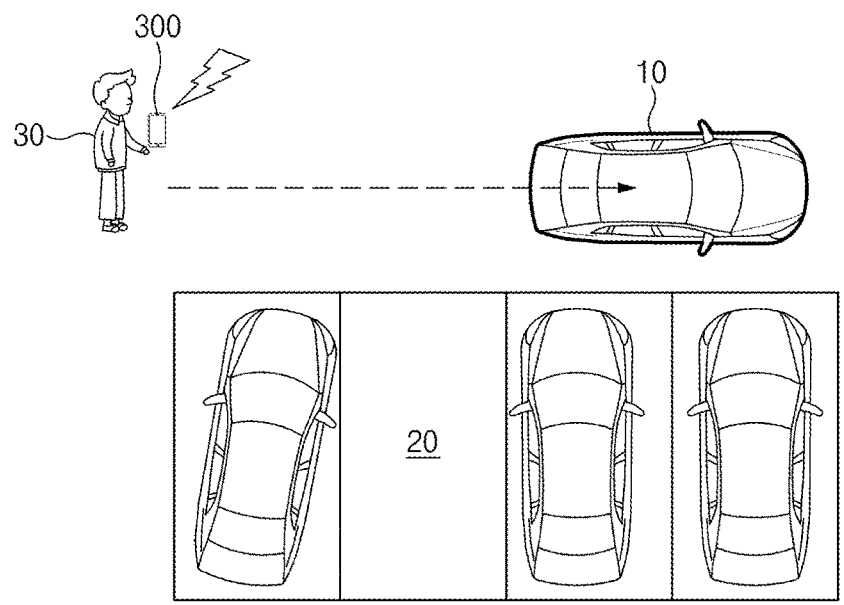
FIG. 6A is a drawing illustrating remotely searching for the parking space in the forward direction.
Figure 6B:
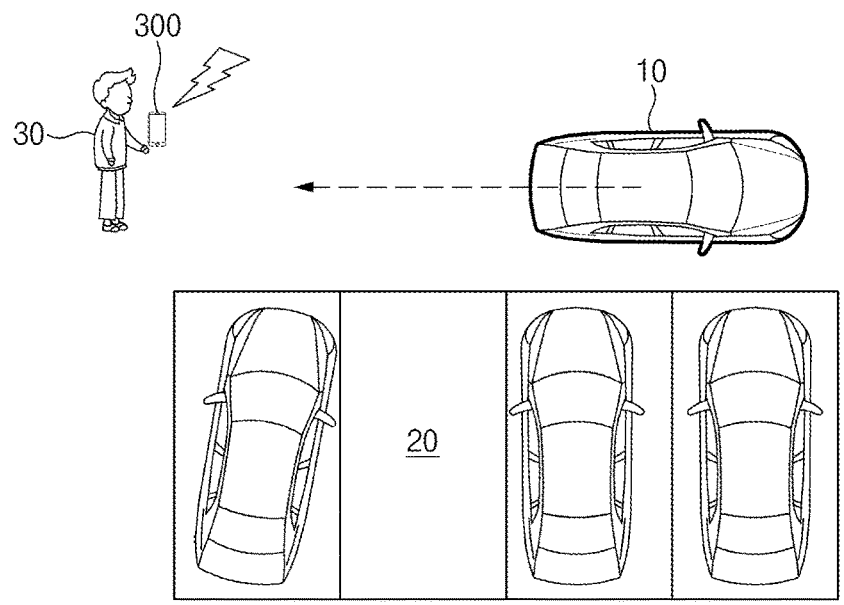
FIG. 6B is a drawing illustrating remotely searching for the parking space in the reverse direction.

FIG. 6A is a drawing illustrating remotely searching for a parking space in the forward direction, in which a driver 30 remotely requests to search for the parking space in the forward direction using the remote control device 300 at a remote place. FIG. 6B is a drawing illustrating remotely searching for a parking space in the reverse direction, in which the driver 30 remotely requests to search for the parking space in the reverse direction using the remote control device 300 at the remote place.

Referring to FIG. 2, the parking path generation device 100 may be operated in a remote smart parking assist electronic control unit (RSPA ECU), and may be operated together with a human machine interface (HMI) for display output, a body control module (BCM) for a body control command, an engine management system (EMS) for a driving torque command, an electronic stability control (ESC) for a braking control command, an electronic parking brake (EPB) for the control of brake lock and brake release, a motor driven power steering (MDPS) for the control of a desired steering angle, and an integrated body control unit (IBU) for the control of remote starting.

Figure 7:
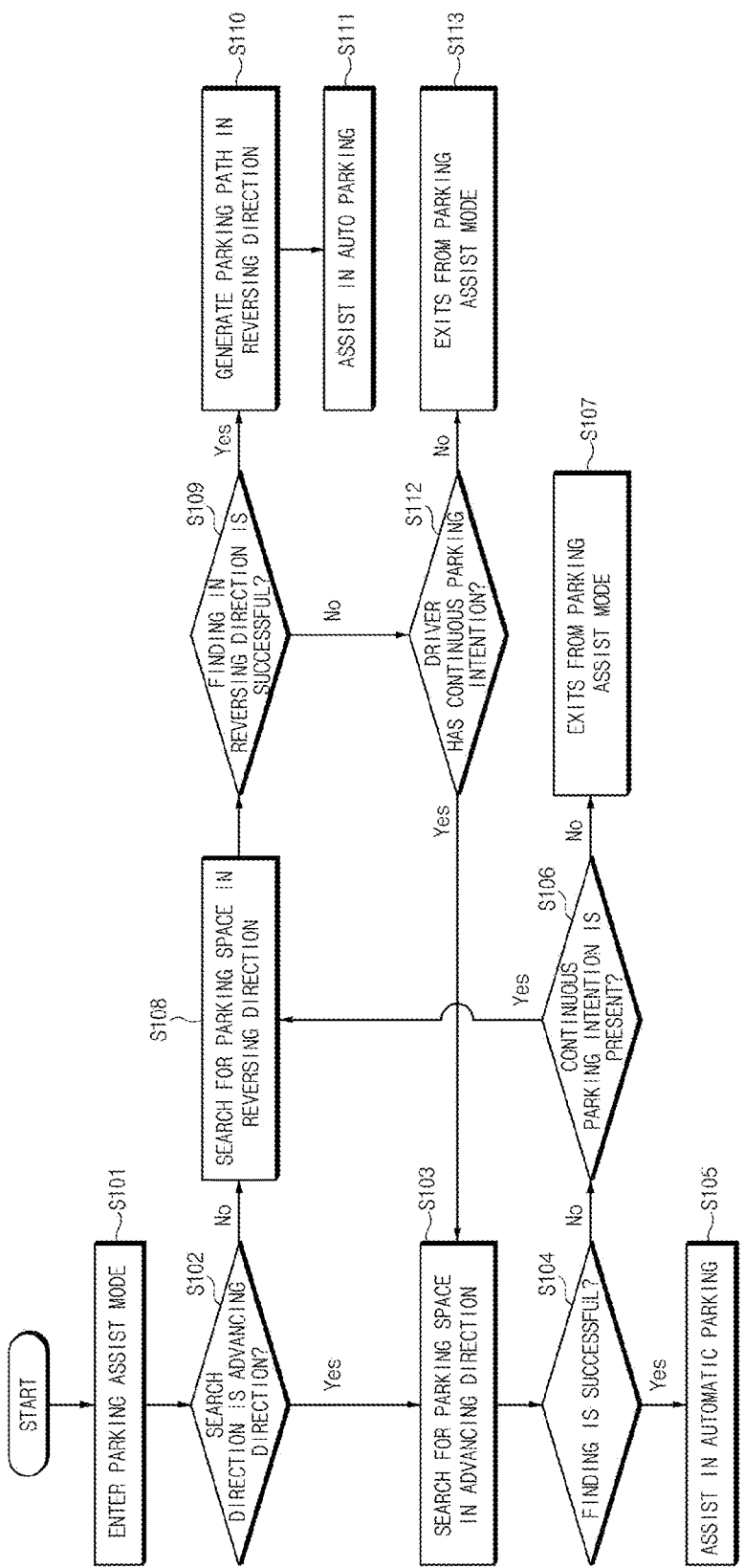
FIG. 7 is a flowchart illustrating a method of generating a parking path by performing an automatic switching operation between forward and reverse directions to search for a parking space.

Hereinafter, a method of generating a parking path by generating a parking path by performing an automatic switching operation between forward and reverse directions and searching for a parking space, according to one form of the present disclosure, will be described in detail with reference to FIG. 7.

The parking path generation device 100 determines a present direction of searching for a parking space (step S102) after the parking path generation device 100 enters a parking assist mode (step S101), and searches for the parking space in a forward direction when the present direction of searching for the parking space is the forward direction (step S103).

Thereafter, the parking path generation device 100 determines whether the parking space is successfully found in the forward direction (step S104), and assists the automatic parking (step S105) when the parking space is successfully found in the forward direction.

Meanwhile, the parking path generation device 100 determines whether the driver continuously has parking intention (step S106), when the parking path generation device 100 fails to find the parking space in the forward direction and searches for the parking space in the reverse direction when the driver continuously has the parking intention (step 108). However, the parking path generation device 100 exits from the parking assist mode (step S107) when the driver has no continuous parking intention.

The parking path generation device 100 searches for the parking space in the reverse direction (step S108) when the present direction of searching for the parking space is the reverse direction in step S102.

Then, the parking path generation device 100 determines whether the parking space is successfully found in the reverse direction (step S109), generates the parking path in the reverse direction (step S110) when the parking space is successfully found in the reverse direction, and assists the automatic parking to follow the parking path generated in the reverse direction (step S111).

The parking path generation device 100 determines whether the driver continuously has the parking intention (step S112), when the parking path generation device 100 fails to find the parking space in the reverse direction in step S109, exits from the parking assist mode (step S113) when the driver has no continuous parking intention, and searches for the parking space in the forward direction (step S103) when the driver continuously has the parking intension.

As described above, when the parking space is not appropriately found by the driver or the system, or the correction is desired for the search for the parking space, the automatic parking system determines whether the driver continuously has the parking intention. If such parking intention exists, the automatic switching operation is performed without the shutdown of the system. The automatic switching operation involves the searching for the parking space in a reverse direction, and generating a dedicated path such that the vehicle is inhibited or prevented from unnecessary travelling to search for the parking space.

Figure 8:
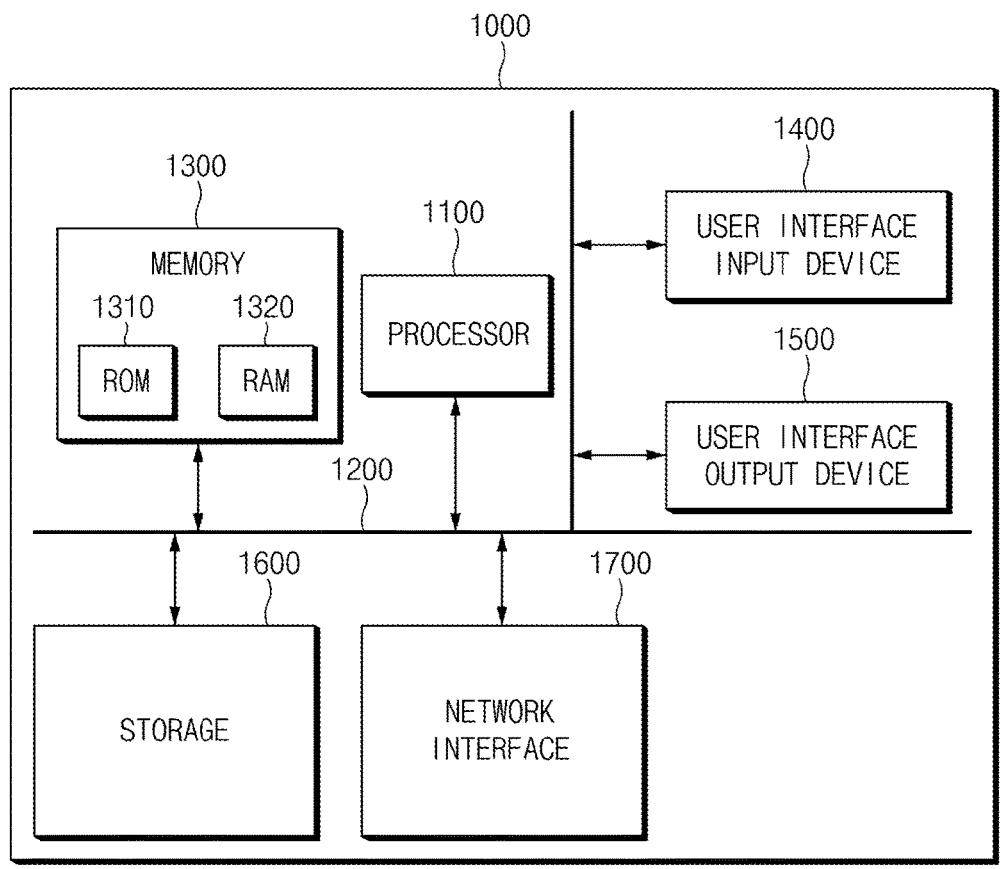
FIG. 8 is a block diagram illustrating the configuration of a computer system, to which the method of generating the parking path is applied, according to an form of the present disclosure.

FIG. 8 is a block diagram illustrating the configuration of a computer system, to which the method of generating the parking path is applied, according to one form of the present disclosure.

Referring to FIG. 8, the computing system 1000 may include at least one processor 1100, a memory 1300, a user interface input device 1400, a user interface output device 1500, a storage 1600, and a network interface 1700, which are connected with each other via a bus 1200.

The processor 1100 may be a central processing unit (CPU) or a semiconductor device for processing instructions stored in the memory 1300 and/or the storage 1600. Each of the memory 1300 and the storage 1600 may include various types of volatile or non-volatile storage media. For example, the memory 1300 may include a read only memory (ROM) and a random access memory (RAM).

Thus, the operations of the methods or algorithms described in connection with the forms disclosed in the present disclosure may be directly implemented in a hardware module, a software module, or combinations thereof, and executed by the processor 1100. The software module may reside on a storage medium (i.e., the memory 1300 and/or the storage 1600), such as a RAM, a flash memory, a ROM, an erasable and programmable ROM (EPROM), an electrically EPROM (EEPROM), a register, a hard disc, a removable disc, or a compact disc-ROM (CD-ROM).

The storage medium may be coupled to the processor 1100. The processor 1100 may read out information from the storage medium and may write information in the storage medium. In other form, the storage medium may be integrated with the processor 1100. The processor and storage medium may reside in an application specific integrated circuit (ASIC). The ASIC may reside in a user terminal. Alternatively, the processor and storage medium may reside as separate components of the user terminal.

As described above, according to the present disclosure, when the searching for the parking space is not appropriately performed or correction is desired in a parking assist operation, the direction of searching for the parking space is automatically switched based on the intention of the driver, the searching for the parking space is performed, and the parking path is generated, thereby assisting parking. Accordingly, parking time may be reduced and the convenience of the driver may be increased.

Hereinabove, although the present disclosure has been described with reference to exemplary forms and the accompanying drawings, the present disclosure is not limited thereto, but may be variously modified and altered by those skilled in the art to which the present disclosure pertains without departing from the spirit and scope of the present disclosure.

Therefore, forms of the present disclosure are not intended to limit the technical spirit of the present disclosure, but provided only for the illustrative purpose. All equivalents thereof should be construed as being included within the scope of the present disclosure.

What is claimed is:

1. A parking path generation device for a vehicle comprising:
   a parking space search unit configured to search for a parking space in a forward direction or in a reverse direction of the vehicle;
   a control unit configured to:
      control a search direction of the parking space search unit based on a parking intention of a driver,
      control a travelling direction of the vehicle, and
      determine whether the parking space search unit fails to find the parking space in the search direction; and
   a path generation unit configured to generate a parking path in the search direction when the parking space search unit finds the parking space,
   wherein the control unit is configured to:
      control the parking space search unit to search for the parking space in the forward direction, when the travelling direction of the vehicle is the forward direction; and
      control the parking space search unit to search for the parking space in the reverse direction, when the travelling direction of the vehicle is the reverse direction.

2. The parking path generation device of claim 1, wherein the control unit is configured to
   determine whether the driver continuously has the parking intention, when the parking space search unit fails to find the parking space.

3. The parking path generation device of claim 2, wherein the control unit is configured to
   control the parking space search unit to search for the parking space in an opposite direction to a direction that the parking space search unit fails to find the parking space, when the driver continuously has the parking intention.

4. The parking path generation device of claim 2, wherein the control unit is configured to
   control the parking space search unit to search for the parking space in the reverse direction, when the driver continuously has the parking intention and when the parking space search unit fails to find the parking space in the forward direction.

5. The parking path generation device of claim 4, wherein the control unit is configured to:
   determine whether the parking space search unit fails to search for the parking space in the reverse direction;

determine whether the driver continuously has the parking intention, when the parking space search unit fails to find the parking space in the reverse direction; and control the parking space search unit to search for the parking space in the forward direction, when the driver continuously has the parking intention.

6. The parking path generation device of claim 5, wherein the control unit is configured to control the parking space search unit to terminate the searching for the parking space, when the driver has no continuous parking intention.

7. The parking path generation device of claim 5, wherein the path generation unit is configured to:

generate the parking path in the reverse direction, when the parking space is found in the reverse direction.

8. The parking path generation device of claim 1, further comprising an automatic parking assist unit configured to assist in automatic parking along the parking path.

9. The parking path generation device of claim 8, further comprising:

a display unit configured to display the parking path on a screen.

10. A system for generating a parking path for a vehicle, the system comprising:

a vehicle surrounding sense device configured to sense a parking space surrounding a vehicle;

a parking path generation device configured to search for the parking space by using a sensing result of the vehicle surrounding sense device and by automatically switching a direction of searching for the parking space based on parking intention of a driver and a travelling direction of the vehicle, and a control unit that is configured to:

control a parking space search unit to search for the parking space in a forward direction, when the travelling direction of the vehicle is the forward direction; and control the parking space search unit to search for the parking space in a reverse direction, when the travelling direction of the vehicle is the reverse direction.

11. The system of claim 10, wherein the vehicle surrounding sense device comprises at least one of an ultrasonic sensor, a lidar sensor, or a camera.

12. The system of claim 10, wherein the parking path generation device comprises:

a parking space search unit configured to search for the parking space in a forward direction or in a reverse direction;

the control unit configured to control a search direction of the parking space search unit based on the parking intention of the driver and the travelling direction of the vehicle, and configured to determine whether the parking space search unit fails to find the parking space in the search direction; and a path generation unit configured to generate a parking path in the search direction when the parking space search unit finds the parking space.

13. The system of claim 12, wherein the control unit is configured to:

determine whether the driver continuously has the parking intention, when the parking space search unit fails to find the parking space;

control the parking space search unit to search for the parking space in an opposite direction to a direction that the parking space search unit fails to find the parking space, when the driver continuously has the parking intention; and control the parking space search unit to terminate the searching for the parking space, when the driver has no continuous parking intention.

14. The system of claim 10, further comprising a remote control device configured to remotely request for the searching for the parking space.

15. A method of generating a parking path for a vehicle, the method comprising:

entering a parking assist mode;

searching, by a parking space search unit, for a parking space in a forward direction when a present direction of searching for the parking space is the forward direction;

determining, by a control unit, whether the parking space is successfully found in the forward direction;

determining, by the control unit, whether a driver continuously has parking intention, when the parking space is not found in the forward direction;

searching, by the parking space search unit, for the parking space in a reverse direction when the driver continuously has the parking intention; and generating, by a path generation unit, a parking path in the reverse direction when the parking space is successfully found in the reverse direction.

16. The method of claim 15, further comprising:

determining, by the control unit, whether the driver continuously has the parking intention, when the parking space is not found in the reverse direction; and searching, by the parking space search unit, for the parking space in the forward direction when the driver continuously has the parking intention.

17. The method of claim 15, further comprising:

assisting, by an automatic parking assist unit, in automatic parking along the parking path in the forward direction, when the parking space is successfully found in the forward direction.

18. The method of claim 17, further comprising:

exiting from a parking assist mode when the driver has no the continuous parking intention.

19. The method of claim 15, wherein the searching for the parking space in the forward direction or the reverse direction is performed using at least one of an ultrasonic sensor, a lidar sensor, or a camera.

20. The method of claim 15, wherein the entering of the parking assist mode is performed through a remotely-controlling operation by a remote control device.

* * * * *